UNITED STATES PATENT OFFICE.

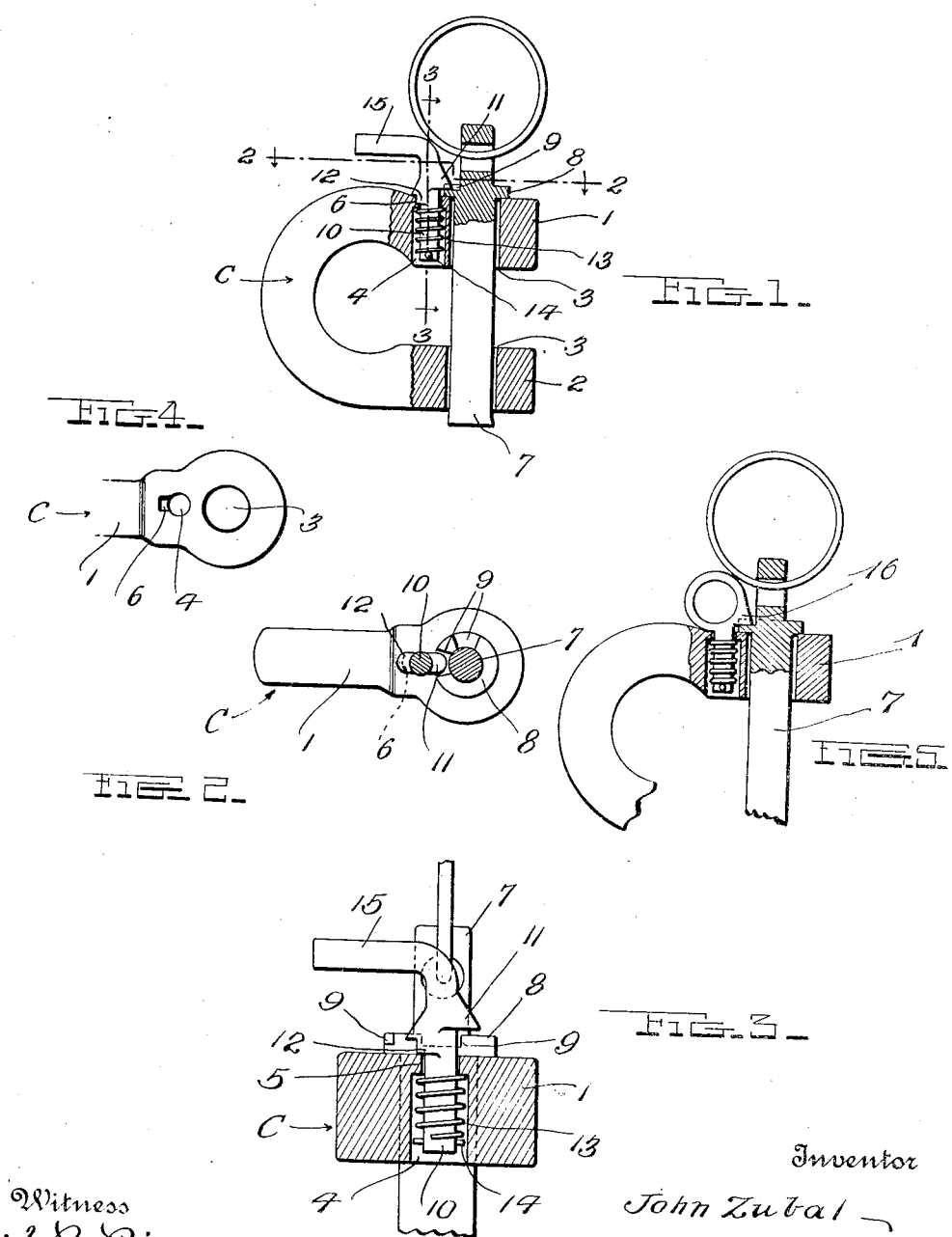

JOHN ZUBAL, OF WALSEN, COLORADO.

SAFETY-CLEVIS.

1,351,825.   Specification of Letters Patent.   Patented Sept. 7, 1920.

Application filed December 18, 1919. Serial No. 345,699.

*To all whom it may concern:*

Be it known that I, JOHN ZUBAL, a citizen of the United States, residing at Walsen, in the county of Huerfano and State of Colorado, have invented certain new and useful Improvements in Safety-Clevises; and I do declare the following to be a full, clear, and exact description of the invention, such as will enable others skilled in the art to which it appertains to make and use the same.

This invention relates to improvements in clevis pin locks.

The primary object is to provide a simple and practical lock for clevis pins, said lock providing means for positively retaining the pin against rotation or longitudinal movement.

With the above and other objects in view, the invention consists of certain novel features of construction, and the combination and arrangement of parts as will be hereinafter more fully described and claimed.

I attain these objects by the construction illustrated in the accompanying drawings, in which:

Figure 1, is a sectional view showing the locking bolt in operative position;

Fig. 2, is a sectional view taken on the line 2—2 of Fig. 1;

Fig. 3, is a sectional view taken on the line 3—3 of Fig. 1;

Fig. 4, is a top plan view of the frame; and

Fig. 5, is a vertical sectional view of a modified form of locking bolt.

Similar numerals of reference designate similar parts throughout the several views.

Reference is now had to the drawings in which is shown a clevis C including a pair of parallel spaced arms which for the sake of clearness will be hereinafter referred to as upper and lower arms 1 and 2 respectively. The arms are provided adjacent their outer ends with a pair of alined pin openings 3. Adjacent the pin opening in the upper arm 1 is a bolt hole 4 arranged parallel with the pin opening in said arm. An annular stop flange 5 is formed on the wall of the bolt hole at its upper end, said flange having a suitable notch or recess 6 in its upper edge at a point preferably diametrically opposite the pin opening 3.

Adapted for insertion in the pin openings 3 is a clevis pin 7 provided near its upper end with an annular flange or stop 8 adapted to rest on the outer face of the upper arm. Formed in the upper face of the annular flange 8 is a pair of radially extending notches 9 adapted to receive a lug to be described. The upper or outer portion of the clevis pin is provided with the usual transverse opening for the reception of a ring.

Slidably and rotatably mounted in the bolt hole 4 is a locking bolt 10 provided adjacent its upper end with a laterally extending lug 11 having a flat lower face and adapted for reception in one of the notches 9 in the flange on said pin. Disposed diametrically opposite the lug 11, but somewhat lower, is a second lug 12 adapted to seat itself in the notch or recess 6 simultaneously with the seating of the other lug 11 in its seat.

Surrounding the locking bolt is an expansion coil spring 13 which passes upwardly against the stop flange 5 and downwardly against a pin 14 or other suitable stop. The spring is adapted to actuate the bolt in one direction, retaining the lugs in their seats when they are in operative positions. Formed integral with the locking bolt, at its upper end, is a handle 15 for operating the bolt.

In operation, the locking bolt 10 is positioned as indicated in Fig. 3, the lug 12 retaining the bolt in raised position. The clevis pin is inserted into the pin openings and the bolt is turned to the position indicated in Fig. 1, in which position the two lugs are seated and the coil spring is acting to retain them in their seats, thereby preventing accidental movement of the pin in any direction.

In a modified form, illustrated in Fig. 5, the locking bolt 15 is provided with a single laterally directed lug 16, said lug being receivable in one of the notches in the stop carried by the clevis pin. In this form, a ring is formed on the upper end of the locking bolt for removing or rotating it.

From the foregoing description taken in connection with the accompanying drawing, the construction and operation of the invention will be readily understood without requiring a more extended explanation.

Various changes in the form, proportion and minor details of construction may be resorted to without departing from the principle or sacrificing any of the advantages of the claimed constructions.

I claim:

1. In a clevis, a frame having a pair of spaced arms provided with alined pin openings, one of said arms having a notch in its outer face, a pin insertible in said openings, a stop formed on the pin adjacent its outer end adapted to rest on one arm of said frame, a slidable and rotatable bolt carried by one arm, a lug on said bolt receivable in the notch in said arm, and a spring for actuating said bolt in one direction.

2. In a clevis, a frame having a pair of spaced arms provided with alined pin openings, one of said arms having a notch in its outer face, a pin insertible in said openings, a stop formed on the pin adjacent its outer end, said stop having a notch in its outer face and adapted to rest on one arm of said frame, a slidable and rotatable bolt carried by one arm, a lug on said bolt adapted for reception in the notch in said flange, a second lug on said bolt diametrically opposite the first lug and receivable in the notch in said arm, and a spring for actuating said bolt in one direction.

3. In a clevis, a frame having a pair of spaced arms provided with a pair of alined pin openings, one of said arms having a bolt hole disposed adjacent to and parallel with the pin openings, an annular stop flange formed adjacent the outer end of the bolt hole, said flange having a notch in its upper face, a pin insertible in said pin openings, an annular flange formed on said pins adjacent its outer end, the flange on said pin having a notch in its upper face, a manually operable locking bolt slidable and rotatable in said bolt hole, a lug formed on said bolt adjacent its outer end and adapted to be received in the notch in the pin flange, a second lug disposed diametrically opposite and inwardly from the other lug, said second lug being adapted for reception in the notch in the stop flange and a coil spring surrounding said bolt and pressing against the lower face of the stop flange to actuate the bolt in one direction.

In testimony whereof I have hereunto set my hand.

JOHN ZUBAL.